United States Patent [19]

Lien

[11] Patent Number: 4,709,323
[45] Date of Patent: Nov. 24, 1987

[54] BUCK-BOOST PARALLEL RESONANT CONVERTER WITH INDUCTIVE ENERGY RECOVERY CIRCUIT

[75] Inventor: Charles Lien, Huntington, N.Y.

[73] Assignee: Venus Scientific Inc., Farmingdale, N.Y.

[21] Appl. No.: 913,141

[22] Filed: Sep. 29, 1986

[51] Int. Cl.$^4$ .................... H02M 7/538; H02M 3/337
[52] U.S. Cl. ........................................ 363/97; 363/26; 363/134
[58] Field of Search ...................... 363/24, 25, 26, 27, 363/28, 97, 134

[56] References Cited

U.S. PATENT DOCUMENTS

| | | | |
|---|---|---|---|
| 3,418,557 | 12/1968 | Schaefer | 363/87 |
| 3,818,307 | 6/1974 | Hamilton et al. | 363/25 |
| 3,921,005 | 11/1975 | Watrous | 363/25 |
| 3,938,024 | 2/1976 | Clarke | 363/24 |
| 4,186,434 | 1/1980 | Cowett | 363/134 |
| 4,223,378 | 9/1980 | Koizumi | 363/134 |
| 4,480,300 | 10/1984 | Luursema | 363/134 |

FOREIGN PATENT DOCUMENTS

| | | | |
|---|---|---|---|
| 2060220 | 4/1981 | United Kingdom | 363/16 |
| 2137780 | 10/1984 | United Kingdom | 363/97 |
| 993404 | 1/1983 | U.S.S.R. | 363/26 |

*Primary Examiner*—William H. Beha, Jr.
*Attorney, Agent, or Firm*—Ostrolenk, Faber, Gerb & Soffen

[57] ABSTRACT

A DC-AC converter circuit for a power supply contains a parallel resonant circuit topology. Accordingly, stray capacitance associated with the converter forms a part of the resonant circuit and assists in setting the resonant frequency thereof. The energy in the stray capacitance which is normally lost is recovered by the resonant circuitry. A coupled inductor is connected in series with a primary winding of an output transformer of the converter. The coupled inductor includes a resonating inductor winding and an energy recovery winding which are tightly wound out of phase with one another. Energy from the resonant inductor winding is coupled to the recovery winding when the switching elements of the converter are switched on and off. Therefore, energy otherwise dissipated in switching operation is conserved by being returned to its source. Further, the switching elements of the converter are connected in series through diodes to the return line. Consequently the converter is capable of operating either in a buck or boost mode and to switch from one mode of operation to the other.

10 Claims, 9 Drawing Figures

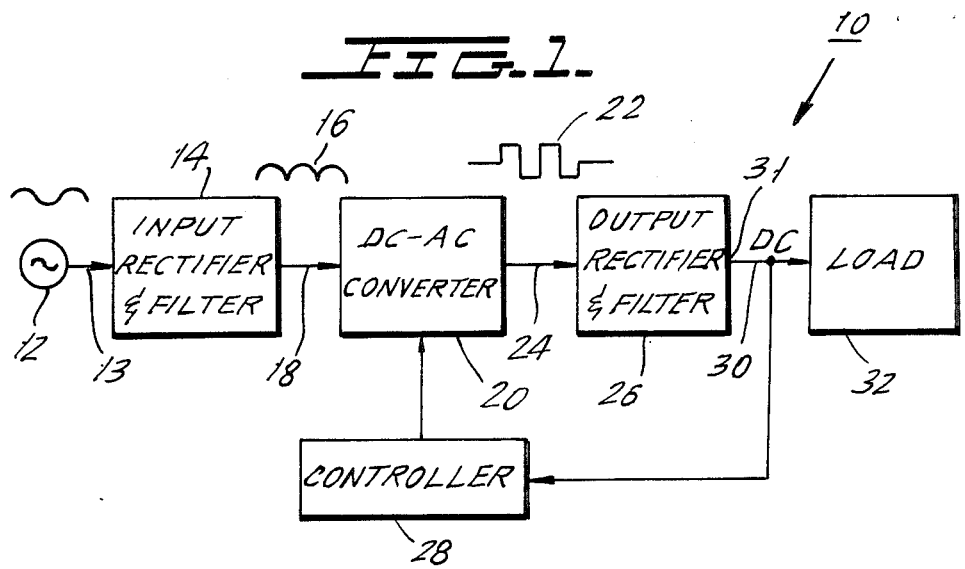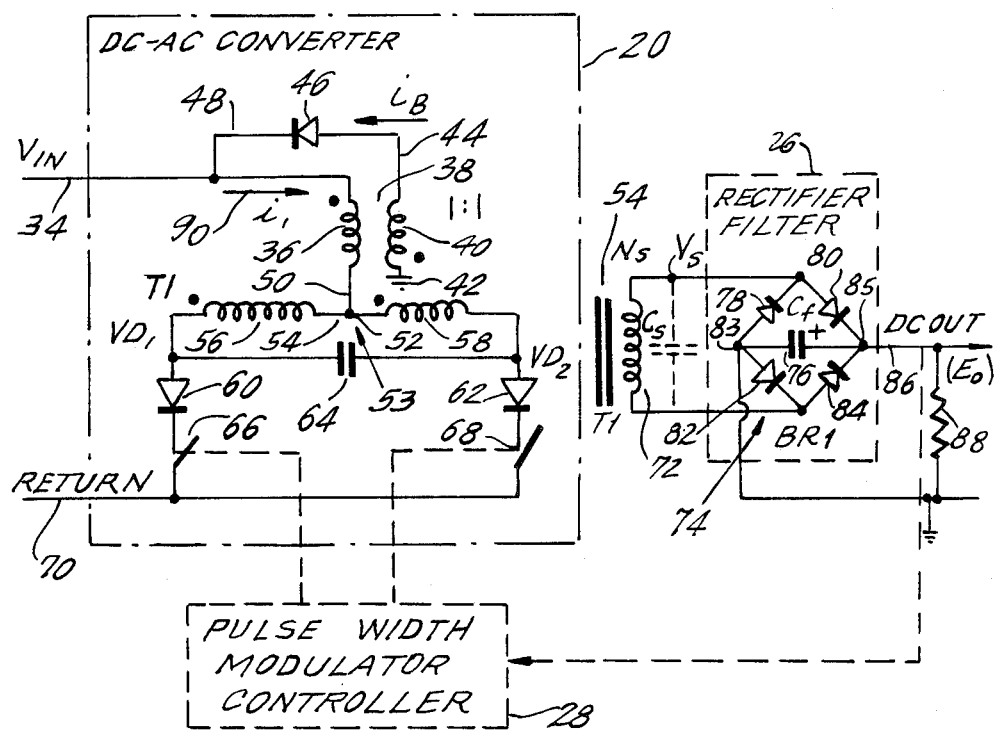

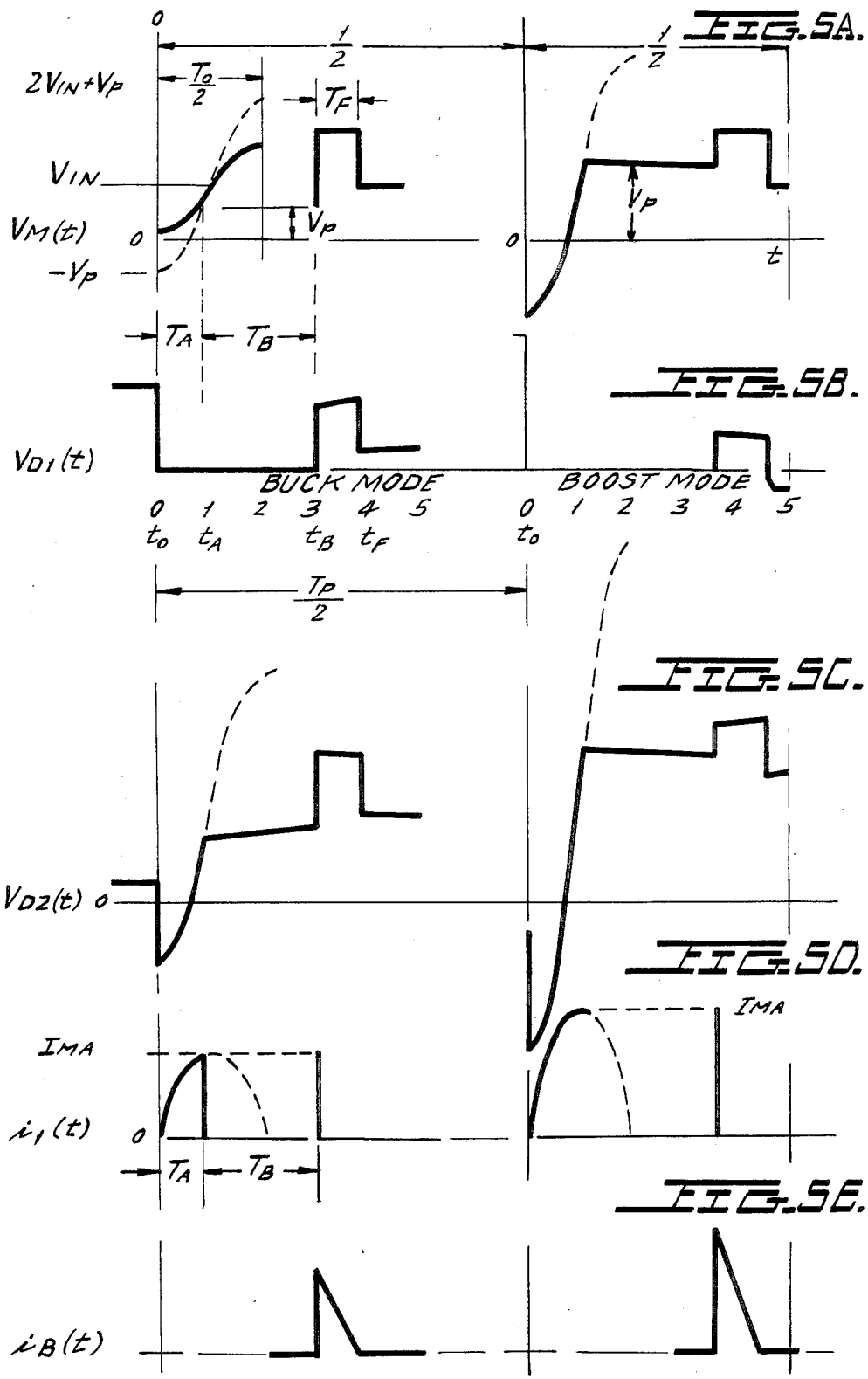

BUCK-BOOST PARALLEL RESONANT CONVERTER WITH INDUCTIVE ENERGY RECOVERY CIRCUIT

BACKGROUND OF THE INVENTION

The present invention relates to a switching power supply and more particularly to a switchmode converter circuit having a parallel resonant circuit topology and a capability to operate in both buck and boost modes.

A converter circuit is used for producing one or more regulated DC output voltages of desired values. The converter generates the regulated output DC voltages from a DC line voltage (DC-DC conversion) or from and AC line voltage (AC-DC). In the latter case an input rectifier is provided for rectifying the input AC line voltage to the unregulated DC voltage that is used by the converter.

By way of background and introduction, switchmode converters operate by switching a DC input line voltage between two primary windings of a transformer which are wound out of phase with one another. The resulting output at the secondary winding is an AC pulse width modulated rectangular wave signal having an output magnitude which is related to the primary voltage by the turns ratio between the secondary and primary windings. This AC signal, at the secondary winding, is rectified, for example by passing it through a full wave rectifier bridge and capacitor filter combination, to obtain an essentially ripple-free output DC voltage. Additional secondary windings are provided if more than one DC outputs are needed.

The magnitude of the output DC voltage with respect to the primary voltage is established primarily by the turns ratio between the secondary and primary windings. It is however also affected by the voltage or current that is impressed on or through the primary windings.

To assure that the output voltage or voltages remain within their prescribed limits, at least one of the outputs is constantly monitored and conditions at the primary are controlled to assure that the output remains within its set limits.

The typical specification of a power supply includes the definition of the following items:

The nominal output voltages;
The minimum and maximum load currents;
The load regulation, e.g. the change in the output voltages for a specified change in any or all of the load currents;
The line regulation, e.g. the allowed change in the output voltages for a specified change in the input voltage;
The cross regulation, e.g. the allowed change in one specific output voltage when the current in other than this specified output is changed by a specified amount;
The input line compliance, e.g. the ratio of the maximum to the minimum input line voltage over which the converter is capable of providing the specified performance.

In one switchmode power supply described in U.S. Pat. No. 4,475,149, in the name of George C. Gallios and assigned to the assignee of the present application, (the contents of which are incorporated herein by reference) the AC line voltage is rectified by a bridge rectifier circuit to produce an unregulated input DC voltage. The unregulated DC voltage has an average or DC value which is subject to AC line voltage fluctuations. A DC input filter receives and filters the input DC voltage to reduce or eliminate ripple voltages therefrom. Thereafter a converter circuit is provided for producing a DC output voltage from the input DC voltage.

The converter "chops" the input DC voltage to produce AC voltage signals at secondary windings of an output transformer. The AC voltage signals at the secondaries are converted to the regulated output DC voltages in the output stage. An output stage includes rectifier and output filtering elements for the output DC voltages. A controller circuit in the DC-AC stage samples and monitors the output DC voltages and controls the voltage or current flowing through the primary windings of the output transformer to assure that the output DC voltages remain within certain set limits.

A typical converter arrangement is shown in FIG. 1 of the drawings.

Certain terms and concepts related to switchmode power supplies are defined and discussed below.

"Switchmode" technique refers to a converter which is based on "chopping" the DC input voltage at a high frequency (typically higher than 50 khz) to convert it to a pulse width modulated AC rectangular waveform having the desired average value. This technique must include a rectifying block to convert the AC to unfiltered DC, and must include an averaging output filter (usually an LC filter) to reduce the chopping frequency related ripple voltage levels to within the desired values.

"Sampling frequency" refers to the frequency at which the controller samples and adjusts the output voltages.

"Control bandwidth frequency" refers to the bandwidth of the feedback control loop. This control bandwidth determines the upper frequency limit for which the control circuit can reduce the influence of disturbing signals.

"Voltage mode" refers to a switchmode converter wherein the pulse width time is controlled, and the current driving the primary of the transformer is influenced by other parameters such as input voltage and output filter inductance value.

"Current mode" refers to a switchmode converter wherein the instantaneous current in the filter inductor is controlled independent of the other variables which influence this current in the voltage mode topology.

"Continuous/discontinuous current switching" is used to denote a converter in which, respectively, the current flowing through the primary winding is continuous or discontinuous. In a discontinuous switcher the current through the primary drops to zero before the end of each control period.

"Zero current turn off" is related to a "discontinuous current switching converter" and denotes the fact that the current through the switching element has subsided before certain switching elements in the converter are turned on or off.

"Series resonant converter" refers to converters which employ a series resonant circuit topology in their DC-AC stage for processing the power from which the output DC voltages are generated.

"Parallel resonance converter" refers to converters in which a parallel resonant circuit is used.

"Q multiplication" is meaningful in relation to converters using resonant circuits and refers to the inherent ability of a resonant converter to develop a voltage which is several i.e. "Q" times larger than an input voltage to which the resonant circuit is connected.

"Buck mode" refers to a converter in which the operating voltage at the primary winding of the converter is lower than the input voltage supplied to the converter.

"Boost mode" is similar to buck mode except that the voltage at the primary is higher than the input voltage.

Besides the obvious need to maintain the output DC voltages within their prescribed limits in the face of input line or output load fluctuations, the converter designer must strive to design the converter to operate at a high efficiency. Efficient converters minimize heat generation. They are smaller in size, weigh less and need not include heat removal means such as heat sinks, fans, and the like. Inefficient converter operation results in part from a converter topology in which switching elements dissipate power each switching cycle.

It is desirable to utilize a switching speed which is as high as possible to allow electrical components to be made smaller at higher frequencies. Increasing switching speeds, however produces more switching cycles per unit time with a consequent reduction in efficiency.

The present invention is directed to a novel and unique switchmode converter which employs a parallel resonant circuit topology and operates at a fixed frequency. In addition, the invention features a unique input coupled inductor that will be described in detail later herein. The input coupled inductor is adapted to divert energy stored in this inductor at the end of a switching cycle back to the input DC voltage source and to prevent dissipation of that inductive energy in the switching elements of the converter. Regulation of the output DC voltages is effected by varying the phase of a control signal with respect to a voltage waveform that is generated by the converter's resonant components. The control signal adjusts output by pulse width modulation of the switching elements in the converter.

It has been customary to use a series resonant topology in which the switching elements of the converter are connected in series with the primary winding of the output transformer and further in series with a resonating inductor and a resonating capacitor.

Series resonant converters do provide certain advantages. They minimize turn on switching transient currents in the switching elements and in the output rectifiers. Another advantage relates to cases where such series resonant converters are operated in a discontinuous mode. In the latter case the losses in the switching elements are minimized and the series topology enables the use of SCR's for the switching elements.

Ideally, all the high frequency current flows in the series resonant converter topology exclusively through the switching elements, the primary winding, the resonating inductor and through the resonating capacitor. In actuality, however, the stray capacitance across the secondary of the output transformer is reflected to the primary of the output transformer. The stray capacitance, therefore, appears in parallel with the primary winding of the output transformer. As such the reflected array capacitance presents a serious problem for series resonant converters since a bypass shunt path is created for some of the resonant circuit current. Particularly in high voltage applications, where the turns ratio of the output transformer is high, very careful and extreme measures must be taken to minimize the stray capacitance. Otherwise, it can interfere with the operation of the converter and reduce its efficiency significantly.

Another disadvantage of series resonant converters arises when such converters operate in the "discontinuous mode". A given fixed amount of energy is transferred each switching cycle from the input line to the output. Control over and regulation of the output voltage is achieved by varying the frequency (control frequency) of operation. As a result, a large load current range requires a correspondingly large frequency shift range for control. Such a system is inherently inferior to and more complicated than a fixed frequency system.

A series resonant converter can be operated in a continuous current mode wherein the next switching cycle is turned on before current from a previous cycle has ceased. But the continuous mode loses the benefit of operating the switching elements when the current is equal to zero, and efficiency suffers. Furthermore, although the continuous mode of operation provides the advantage of higher power density, i.e. more power is generated from a given converter size, the allowable range of the controlling frequency is smaller. Therefore, the dynamic control range of the output power is accordingly limited.

SUMMARY OF THE INVENTION

Accordingly, it is an object of the present invention to provide a high efficiency switchmode converter.

It is another object of the present invention to provide a switchmode converter which employs a parallel resonant topology that can accommodate the stray capacitance of the converter.

It is a further object of the invention to provide a switchmode converter which includes an energy diverter (a current path) means which are operable for returning energy still available in the inductor at the end of each switching cycle to minimize losses in the switching elements of the converter.

It is another object of the present invention to provide a switchmode converter which is capable of operating either in the boost mode or the buck mode and of automatically transiting from one mode of operation to another.

The foregoing and other objects of the invention are realized with a converter which has the familiar functional blocks of a switchmode power supply including for example an input rectifier and filter circuit which receives AC power and converts that power to an unregulated DC voltage. A DC-AC circuit block of the converter is responsive to the DC input voltage to generate therefrom one or more AC signals of different magnitudes. Output rectifier and filter circuits rectify the AC signals generated in the DC-AC stage to one or more DC output voltages which are suitable for driving loads. A controller in the DC-AC block samples at least one of the DC output voltages and adjusts the electrical conditions in the DC-AC stage to assure that the output DC voltages remain within prescribed voltage and/or current limits.

The present invention is specifically directed to a novel converter which includes a parallel resonant circuit topology which is configured to advantageously harness the stray capacitance in the converter. A novel coupled inductor circuit is included which enables residual energy in the resonant circuit at the end of each switching cycle to be returned to its source. The converter operates at a fixed control frequency.

A controller circuit of the DC-AC stage regulates the current flowing in the windings of the primary during each control cycle so that just enough current is delivered to an "output rectifier and filter" circuit block to maintain the DC output voltages within their limits irrespective of and despite load and input line fluctuations. The control frequency is relatively high, normally in the 50 to 500 kilohertz range. This yields a control bandwidth which is high enough to electronically regulate out line frequency related ripple voltages that may be present at the input end of the converter. The high control bandwidth provides, in addition, inherent short circuit protection since the fast and highly responsive control is able to shut off the converter before sensitive electrical components are damaged.

The converter of the invention may be operated in a continuous or discontinuous mode and it will automatically transit between buck and boost modes as required by the conditions of operation.

The coupled inductor includes a resonating inductor winding and a energy recovery inductor winding which are tightly wound and out of phase with one another. The windings of the coupled inductor are connected to the input DC voltage directly or indirectly through an input filter. The resonating inductor winding is connected to the center tap of an output transformer having a primary with first and second coupled and also out of phase windings. Each of the primary windings is connected in series with a respective diode and a switching element. The switching element comprises a transistor or the like having one terminal, i.e. for bipolar transistors, emitter or collector which is connected to the return (ground) line. A resonating capacitor is connected across the primary windings of the output transformer.

One or more secondary windings of the output transformer have a turns ratio which is selected to produce an AC voltage/current signal of a magnitude needed for the DC output voltages. A respective full wave rectifier bridge is connected to each secondary winding to convert its AC signal to a DC output in the conventional manner.

A fixed frequency pulse width modulation controller of known type samples and compares the value of one of the DC outputs to an internal reference. An error signal is then delivered which adjusts the current flowing through the primary windings by varying the instant at which the switching elements connected in series with the primary windings are turned on and off. Thereby the voltage magnitudes of the DC outputs are maintained within specified limits.

The converter topology of the present invention offers several distinct advantages over prior art converters. The resonating capacitor connected across the primary windings and the stray capacitance of the converter are in parallel to one another. Consequently, the resonant frequency of the parallel resonance converter is determined by the values of the coupled inductor winding, the resonating capacitor, the stray capacitance and to a lesser extent by the inductance of the primary winding. Therefore, instead of constituting a troublesome and energy dissipating element, the stray capacitance is turned into an asset by becoming part of the capacitor portion of the parallel resonance circuit.

Further, energy remaining in the converter at the end of each switching cycle is returned to its source rather than being unproductively dissipated. Moreover, since the effects of switching inefficiencies are reduced the converter can be operated at higher frequencies. The higher frequencies, in turn, produce a very high control bandwidth, providing a tight and fast control response. Consequently, the controller is itself capable of reducing or eliminating high frequency ripple voltages which simplifies the design of the output filter. Additionally, the fast response provides an inherent short-circuit protection capability as the converter can sense and shutdown the converter before sensitive electrical components are damaged during short circuit conditions.

Other features and advantages of the present invention will become apparent from the following description of the invention which is provided below in relation to the appended drawings.

BRIEF DESCRIPTION OF THE DRAWINGS

FIG. 1 is a block diagram of a switchmode converter.
FIG. 2 is a circuit diagram for the DC-AC converter and for the output rectifier and filter blocks of FIG. 1.
FIGS. 5a–5e are timing diagrams showing signals associated with the converter of the present invention.

DETAILED DESCRIPTION OF A PREFERRED EMBODIMENT

Figure 3:
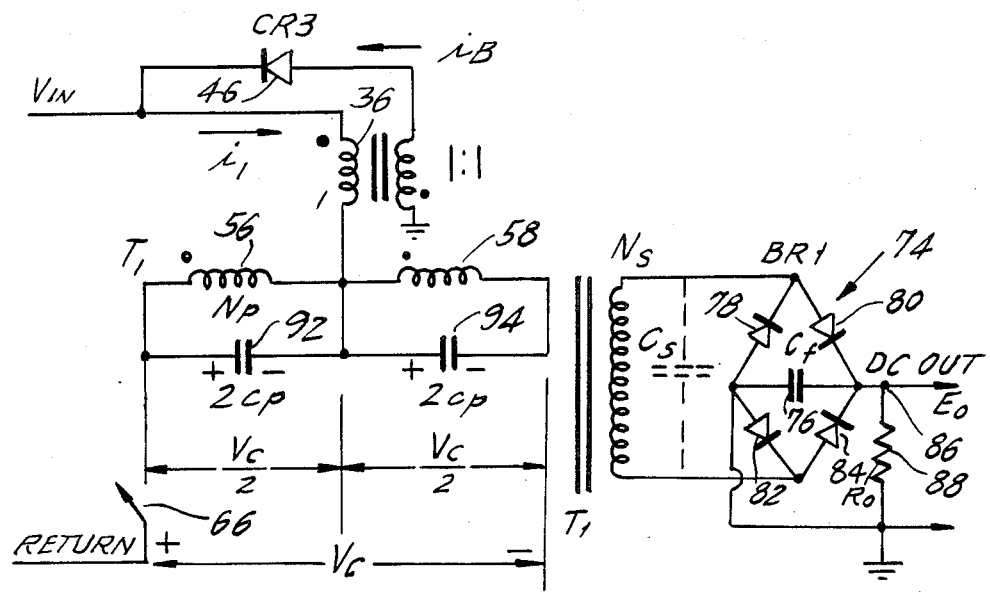
FIGS. 3 and 4 are equivalent circuits for the circuit of FIG. 2, presented for aiding explaining of the operation of the preferred circuit.

The basic block diagram of a switchmode converter is illustrated in FIG. 1.

A power converter 10 of the present invention is responsive to AC input power from a voltage source 12. The AC power which may be single phase or multi phase is received by input rectifier and filter block 14 which rectifies the AC power to produce at output 18 thereof an input line DC voltage 16. Input rectifier and filter block 14 is of the known type and may include bridge rectifiers for rectifying the AC output, an LC filter for filtering and storing rectified power and appropriate EMI circuitry for reducing electromagnetic radiation into the AC supply 12 and/or into the environment.

Input line DC voltage 16 is supplied to DC-AC converter 20 in which the input line voltage is "chopped" to produce an AC signal waveform 22 at an output 24. The peak to peak magnitude of AC signal 22 is primarily set by the turns ratio of a primary transformer in the DC-AC 20. The turns ratio is selected so that rectification of AC signal 22 in output rectifier and filter circuit 26 produces at output 30 an output DC voltage 31 of a specified magnitude needed for driving a load 32.

The impedance of load 32 and the level and ripple voltages associated with input line DC voltage 16 can fluctuate widely in response to external conditions. Output DC voltage 31 must be regulated to remain within certain set limits despite these fluctuations. To this end controller 28 responds to the voltage of output DC voltage 31 by producing control signals which are supplied to DC-AC converter 20. The control signals regulate the current content or magnitude of AC signal 22 such that output DC voltage 31 remains relatively constant despite such fluctuations in load impedance and input line level or ripple.

The present invention provides a novel and improved topology for DC-AC converter 20. The topology simplifies the structure of output rectifier and filter 26 of FIG. 1.

Referring to FIG. 2, input line DC voltage 16 of FIG. 1 is made available at line 34 in FIG. 2. Voltage 16 is connected to coupled inductor 38 consisting of tightly wound resonating inductor winding 36 and recovery inductor winding 40 phased as shown and having a turns ratio of 1:1. One terminal of resonating inductor 36 is connected to line 34 and the other terminal 50 of resonating inductor 36 is connected to center tap 52 of output transformer 53. Recovery inductor 40 is connected at one end to ground 42 and at the other end 44 to line 34 through diode 46. Coupled inductor 38 could be a bifilar wound device.

Output transformer 53 is a center tapped transformer having symmetrical primary windings 56 and 58, phased as shown, and a secondary winding 72 having a turns ratio A and coupled to the primary winding by core 54. A resonating capacitance 64 is connected across primary windings 56 and 58. Primary winding 56 has a current path to return line 70 through diode 60 and switch 66. The current path of primary winding 58 is through diode 62 and switch 68. Switches 66 and 68 while shown as mechanical switches are preferably semiconductor switches such as bipolar transistors, SCR's, FET's or other switching devices.

AC signal 22 at secondary winding 72 is received and rectified by full wave bridge rectifier 74 which includes diodes 78, 80, 82 and 84 arranged as shown. Rectifier 74 delivers at is DC terminals 83 and 85 a DC output voltage 86 having a voltage $E_o$. Voltage 86 is supplied to load 88 (more generally, load 32 of FIG. 1) which in FIG. 2 is a resistive load but which could just as well be a load containing reactive components. Output capacitor 76 is connected across DC terminals 83 and 85 of bridge rectifier 74.

Capacitance $C_s$ shown in dotted lines across secondary winding 72 represents the ubiquitous and unavoidable stray capacitance that is always present at the secondary of converter 10.

Controller 28, previously referred to, is a pulse width modulator controller which is disposed between DC output voltage 86 and switches 66 and 68 of DC-AC converter 20. Since control terminals of switches 66 and 68 are electrically near ground potential, the switches can be easily controlled with readily producible ground referenced signals which are developed in controller 28. Controller 28 operates at a very high switching frequency, usually between 50 to 500 kilohertz. Twice during each control period or in other words during each half cycle it turns on and then off one of switches 66 and 68 whereby the power delivered to the secondary is regulated to maintain output voltage 86 within certain set limits. The internal structure of pulse width modulator controller 28 is conventional. The controller contains an internal power source, comparators for comparing the DC output voltage to an internal reference, a frequency source which determines the control frequency at which switches 66 and 68 are toggled and output sampling and other components associated with controlling DC-AC converter 20. The circuit of FIG. 2 constitutes a DC-AC converter which employs a parallel resonant circuit topology and which operates at a fixed control frequency. It also includes a novel and unique coupled inductor 38 which together with the other elements of converter 30 operates as follows.

Controller 28 contains a frequency oscillator which produces bias control periods $T_p$. The switching frequency is normally set somewhere between 50 to 500 kilohertz. For a switching frequency of 100 kilohertz, each control period $T_p$ lasts for 10 microseconds and has two half wave subperiods each lasting 5 microseconds. Typically during a first half cycle cycle of the control one of the switches, for example, switch 66, is first closed and then opened and during the second half wave period the second switch 68 is closed and then opened.

Each time one of the switches 66 and 68 is operated, current from input line DC voltage 34 flows to a respective one of primary windings 56 or 58. Since the two primary windings are out of phase with one another the voltage across secondary winding 72 is an AC signal 22 having a general waveform as shown for example in FIG. 1. AC signal 22, therefore, switches at the frequency of the frequency oscillator associated with controller 28.

To a first approximation the magnitude of output DC voltage 86 is determined by the turns ratio A associated with output transformer 53, the line voltage and the duty factor. However the exact value of voltage 86 is further regulated by controller 28 which controls the pulse width modulation duration during each half cycle during which switches 66 or 68 remain in their closed i.e. conducting position. Since power is delivered to the secondary only during the time when one of the switches is closed, the closure interval controls to an extent the power and hence the voltage that is delivered to an output capacitance 76. Thereby the value of output DC voltage 86 can be accurately controlled.

Resonating inductor 36, resonating capacitor 64, and stray capacitance $C_s$ together form a resonant circuit which will resonate at a given resonant frequency during the period when one of the switches 66 or 68 is closed. Initially, during the short interval in the beginning of each half cycle in the control period both switches 66 and 68 are opened. However, a certain initial charge is stored in capacitor 64 in the form of a voltage from a previous control cycle. As soon as one of switches 66 or 68 is closed, current starts to flow in the resonant circuit and to resonantly build up a voltage across one of primary windings 56 or 58, depending on which one of switches 66 or 68 is closed. Eventually the voltage on one of the primary windings increases rapidly to develop a voltage at secondary winding 72 which begins to approach the voltage value $E_o$ impressed across output capacitor 76. The voltage at secondary winding 72 will eventually rise sufficiently to forward bias the diodes of bridge rectifier 74. At that time power can be delivered to output capacitor 76. The latter capacitor is selected by design to have a value at least 100 times as large as the combined capacitance or resonating capacitor 64 and stray capacitance $C_s$. As such capacitor 76 begins to predominate when the diodes are forward biased. Capacitor 76 therefore appears to the secondary as a constant voltage sink. As a result the voltage across capacitor 76 does not increase appreciably and energy from output transformer 53 is converted into charge on capacitor 76 which is needed to maintain the output 86 at its rate voltage. Eventually, controller 28, which senses and monitors continuously the output voltage 86, will note that capacitor 76 has been charged to its full value. At that point controller 28 will open switch 66 or 68 that was on during the preceding half wave period.

At the instant the closed switch 66 or 68 is opened, a certain amount of energy is still stored in resonating inductor 36. Rather than permitting that energy to be dissipated or radiated (and therefore wasted) through switch 66 or 68 the energy is used for generating a counter EMF which is coupled to recovery winding 40 of coupled inductor 38. Consequently a voltage develops across recovery winding 40 which forward biases diode 46, thereby effectively sourcing additional current into voltage source $V_{in}$ located in input rectifier and filter block 14 shown in FIG. 1.

Assuming that switch 66 was operated during the first half wave period, switch 68 will then be operated in the second half wave period so that during any given control period $T_p$ the entire process is repeated. Several attributes which affect the operation of the circuit of FIG. 2 are as follows. The stray capacitance $C_s$, which usually interferes with the operation of a series resonant circuit, is effectively reflected as a capacitance $A^2C_s$ ("A" is the turns ratio of output transformer 53). Capacitance $A^2C_s$ is in parallel with resonating capacitor 64 and may be added thereto. The resulting parallel resonant circuit therefore includes resonating inductor winding 36 and the combined capacity of resonating capacitor 64 and reflected stray capacitance $A^2C_s$. The value of these components produces a predetermined resonance frequency which is fixed for a given converter design. With knowledge of that resonant frequency, the frequency oscillator of controller 28 is selected to produce a control time period $T_p$ whose frequency is approximately equal to 40% of the resonance frequency. Therefore in any given half cycle of the control frequency of the resonance frequency is able to go through at least about one resonance cycle.

Moreover, since resonating capacitor 64 is, from a circuit point of view, connected in parallel with stray capacitor $C_s$, capacitor 64 may be physically located either across the primary or across secondary winding 72 or subdivided into two parts and located across both the primary and the secondary windings. The choice of locating capacitor 64 is dictated by considerations which are dependent on whether the converter is used for low voltage or high voltage operations, the selection being made to optimize the size and weight parameters of the converter. In transferring capacitor 64 to the secondary winding or in calculating the effective resonance of the circuit care is taken to account for the physical location of a capacitor at the secondary winding end.

The converter topology of FIG. 2 can operate both in a buck mode or in a boost mode. In a buck mode the voltage that develops across primary windings 56 and 58 is smaller than the voltage $V_{in}$. In a boost mode that voltage is larger than $V_{in}$. The Q multiplication effect associated with resonant circuits is capable of generating a large voltage and of storing sufficient initial charge than allows the converter circuit to operate over widely ranging input line DC voltages $V_{in}$. Converter 20 thereby provides a high "input compliance ratio" measuring 5 or more.

In practical terms this means that a converter designed to operate off a nominal 100 volt DC source ($V_{in}$) is capable of regulating and keeping the DC output voltage within its set limits even if Vin varies from 40 to 200 volts, i.e. $200 \div 40 = 5$.

The combination of the high switching frequency afforded by this topology and the ability of the circuit to operate in the discontinuous mode provides the opportunity to provide good short circuit protection in that the power to rectifier filter 26 can be shut down within a relatively short time (a few microseconds), i.e. before sensitive electrical components can be damaged. For example the typical 100 KHz switching frequency results in the 50 μsec half period. The ability to operate in the discontinuous mode requires the current in the circuit to be forced to zero within this half period, and usually within a fraction of this half period interval. Even when the circuit is operating in the continuous mode, the topology of this patent application retains its ability to instantaneously shift to discontinuous mode operation. It will therefore always cease to deliver power from the line to the output within a few microseconds from the time it is commanded to cease delivering power to the output, even if in the continuous mode of operation.

A more rigorous analysis of the circuit of FIG. 2 is provided below in relation to FIGS. 3-5. FIG. 3 is a simplified schematic of FIG. 2 which will aid the reader in following the operation of the converter of FIG. 2. Note capacitor 64 of FIG. 3 is disposed across primary windings 56 and 58. Since these windings are tightly coupled, e.g. the magnetic coefficient of coupling is very close to 1.0, the voltages across each of the windings 56 and 58 are equal and (as shown by the polarity dots) out of phase with one another. Therefore, due to transformer action of windings 56 and 58, capacitor 64 may be replaced by two capacitors 92 and 94 connected as in FIG. 3. The substitution will not produce any change in the operation of the circuit provided each of capacitors 92 and 94 has a value twice the capacitance of capacitor 64.

As previously noted a power cycle lasts for a duration $T_p$ and consists of two half periods each constituting one subcycle. Focusing on one subcycle it is assumed that switch 68 will remain open during that subcycle period. Switch 66, however, will first be closed (conducting) and then opened during this sub cycle period.

Figure 4:
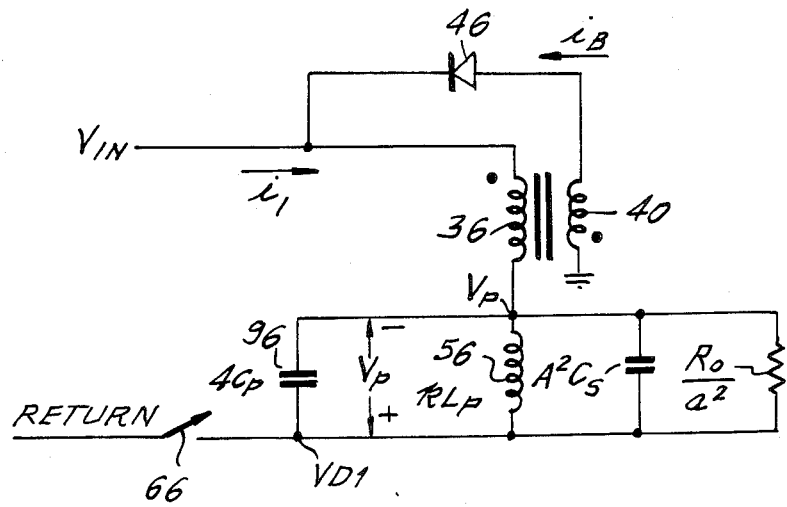

The transformer action of primary windings 56 and 58 allow capacitors 92 and 94 (each having a value of $2C_p$) to be represented as a single capacitor 96 which is depicted in FIG. 4 and which has a value of $4C_p$.

The capacitance which will figure in calculating the resonant frequency of the circuit of FIG. 4 must also account for capacitance $C_s$ (the stray capacitance) reflected into the primary circuit in parallel to capacitor 96. The stray capacitance will have a value $C_s$ when bridge 74 is nonconducting and a value $C_s + C_f$ (the capacitance of output capacitor 76) when bridge 74 is conducting. Output transformer 53 has a turns ratio "A" where A equals to NS/NP. Therefore, the effective value of $C_s$ at the primary side will be $A^2C_s$ as shown in FIG. 4. $R_o$, representing the load 88 of the secondary will be reflected to the main output transformer primary half 56 as a value $R_o/A^2$.

The simplified circuit of FIG. 4 includes inductance $L_p$, representing the inductance of primary winding 56. This completes the circuit transformation of FIG. 2 into the circuit of FIG. 4.

Referring now to FIGS. 5A-5E, it is taken into consideration that a residual charge of a polarity shown will appear on capacitor 96 of FIG. 4 from the immediately previous control cycle. This represents the "initial condition" for the circuit analysis. Time $t_o$ is defined as the time when $t=0$. At time $t_o$ in FIG. 5A, both switches 66 and 68 will be open and there will be a voltage $E_o$ (which is equal to the output DC voltage) across capacitor 76. Further, since switches 66 and 68 are open there will be no current in secondary winding 72 and none of diodes 78, 80, 82 and 84 will be conducting. Under these conditions voltage $V_s$ across secondary winding 72 is lower than $E_o$ and output capacitor 76 is effectively disconnected from the circuit.

$L_p$, the inductance value of each primary inductance half, is by design quite large. Therefore, an insignificant current flows out of capacitor 96 during the half wave time intervals of the converter. The high $L_p$ value also assures that capacitor 96 does not discharge significantly during the time when switches 66 and 68 are open. Therefore, voltage $V_s$ across secondary winding 72 will be very close to and only slightly lower than voltage $E_o$. Voltage $V_p$ (see FIG. 4) across output transformer primary winding 56 equals about $E_o/A$ and has a polarity as shown. During this initial interval current $i_1$ and $i_B$ flowing, respectively, through resonating inductor 36 and recovery inductor 40 will be zero. The voltage between the open terminals of switch 66 is therefore equal to $V_{in}+V_p$ since no voltage appears across inductor 36 at the present time.

The waveforms shown in FIGS. 5A through 5E define certain output signals which relate to the simplified circuit of FIG. 4. The conditions at time $t_o$ have been described above. The voltage $V_p$ can have a value which is less than $V_{in}$, in which case the converter is operating in a buck mode, or a value which is greater than $V_{in}$, in which case the converter is operating in the boost mode. The signal's waveforms vary in dependence on whether the converter operates in the buck or boost modes. Therefore, in FIG. 5, the left hand side shows the buck mode waveforms and the right hand side shows the boost mode waveforms.

$L_p$ in FIG. 4, the primary winding inductance of either one of primary windings 56 or 58, is by design several times larger than the inductance of resonating inductor 36. Therefore, $L_p$ may be ignored in the calculations which still provide an adequate indication of the converter's response.

During the beginning of the half period, the voltage $V_s$ (FIG. 3) is smaller than the voltage $E_o$ and therefore none of output rectifiers 78, 80, 82 and 84 will be conducting. Therefore, $R_o$ and $C_f$ are isolated by the rectifiers (78, 80, 82 & 84) and are not part of the active circuit. The resulting equivalent circuit contains resonating inductor 36 in series with the parallel combination of capacitances $4C_p$ and $A^2C_s$. The two capacitances may be considered as one capacitor $C1=4C_p+A^2C_s$.

Returning to FIGS. 5A-5E, at time $t_o$, a half cycle control sequence begins with the closing of switch 66. This causes voltage VD1(t) (FIG. 4) to change abruptly from its previous value of $V_{in}+V_p$ to zero volts since it will be clamped to return line 70. This causes a voltage $V_{in}+V_p$ to be impressed across resonating inductor 36 with the positive voltage at the polarity dot of inductor 36. By transformer action, the same voltage will appear across recovery winding 40 reverse biasing diode 46. Therefore current will not flow in recovery inductor 40 at the present time. At this instant in time, since switch 66 is closed and provides a path from $V_{in}$ to return line 70, the resonant circuit begins to conduct current according to a waveform denoted as VM(t). Ordinarily, and if left unrestricted, waveform VM(t) would resonate from an initial value of $-V_p$ through a current maximum (which occurs when VM(t) is equal to $V_{in}$) and then to a peak of $2V_{in}+V_p$.

After an interval $T_A$ occurring at $t=t_A$ the voltage on capacitor $c_1$, which initially had a value $-V_p$ (with respect to return line 70), will have been converted to electromagnetic energy stored in resonating inductor 36, indicated by current $i_j$. As the circuit continues to resonate, the electromagnetic energy in inductor 36 is converted back to electrostatic energy in capacitor C1, except that the voltage polarity on capacitor C1 will be reversed. Energy flows back and forth between inductor 36 and capacitor $C_1$ except for small losses in the conversion. This energy recovery and restoration process contributes significantly to the overall efficiency of the converter topology of the present invention, particularly at high switching control frequencies, or high voltage applications. In the latter cases the stray capacitance which is reflected from the secondary to the primary could cause very significant losses through dissipation in the semiconductive switches as they are turned on and off many times per second.

An example illustrates the point. A stray capacitance of a mere 25 picofarads in the secondary (assuming a high voltage application) with a turns ratio of 100 translates into a large capacitance of 0.25 microfarads in the primary. This is a high capacitance which would cause significant losses and reduce efficiency as the control frequency is increased. However with the present invention the switching frequency can be increased without encountering the prior art problems. As a benefit, the very fast response time in the control loop of controller 28 is obtained and the size and weight of the power supply components are reduced.

Returning to the circuit analysis, during the first interval $T_A$, the control frequency is determined by the values of inductor 36 and capacitor $C_1$ during the period from $t=t_o$ to $t=t_A$. Thus:

$$F_A = \frac{1}{\sqrt{L_{36}*C_1}}$$

and $$W_A = 2*PI*F_A$$

$C_1$ represents the sum of all capacitors except for $C_f$, the value of capacitor 76.

The characteristic impedance of this resonant circuit during this time interval is $ZO_a$ where:

$$ZO_a = \sqrt{\frac{L_{36}}{C_1}}$$

Therefore, during the interval of time $t_o$ to $t_A$ the equation for the voltage VM(t) and the current $i_1(t)$ are as follows:

$$Vm(t) = -((V_{in}+V_p)*Cos(WA*t)) + V_{in}$$

where $V_{in}+VP$ is the max voltage across resonating inductor 36.

$$i_1(t) = IMA*Sin(WA*t),$$

where $$IMA = (V_{in}+V_p)/ZO_a$$

Thus at the time when t equals $t_A$ the voltage across the primary transformer winding will have a value which is large enough to make the voltage at the secondary $V_s$ equal to $E_o$, the output DC voltage. This will forward bias the diodes in bridge 74 and will cause capacitor 76 to appear at the primary side of transformer 53.

By design the value $C_f$ of capacitor 76 is made much larger than the stray capacitance $C_s$ and larger than resonating capacitance 64, preferably 100 times greater than the sum of the two. This is usually the case since output capacitor 76 is large compared to the less than one nanofarad value of the other capacitances.

It is therefore correct to assume without distorting the analysis that $C_f$ is very large and therefore the capacitance that is added into the resonant circuit is essentially equivalent to a battery that is being charged (a constant voltage sink). This clamps voltage VM(t) to the voltage $V_p$ for the duration $t_A$ to $t_B$ or in other words the time interval $T_B$. However, although VM(t) is clamped to the voltage $V_p$, at $t=t_A$ the current through the resonating inductor 36 is:

$$i_1(t_A) = IMA * (\operatorname{Sin} WA * t_A)$$

At $t = t_A$ the voltage impressed across inductor L36 (conveniently labelled VL36) equals:

$$VL36 = V_{in} - V_p \text{ for } 0 < = TA < = TO/4 \text{ (Buck Mode)}$$

or $$VL36 = V_p - V_{in} \text{ for } \frac{TO}{4} < = TA < = \frac{TO}{2} \text{ (Boost Mode)}.$$

The voltage VL36 across inductor 36 causes a rate of change of current $i_1$ through the inductor during the time interval $t_A < = t < = t_B$ which shall be designated $di_1(tB)/dt$, where:

$$di_1(tB)/dt = VL36/L36$$

Since $V_{in}$ is greater than $V_p$ in the buck mode, during the $T_B$ interval, the current through inductance 36 designated $i_1(t_{ab})$ will increase. As shown in FIG. 5d during this interval the current $i_1(t)$ will increase moderately. The same current will generate a current in the secondary at the same time which will deliver electrical charge to capacitor 76 which is needed to maintain the average voltage on capacitor 76 at the value $E_o$, i.e. the regulation voltage. The charge that will be delivered will be the integral of the current $i_1(t)$ during the interval $T_B$. The controller 28 will be monitoring the voltage $E_o$ and when it senses that enough charge has been delivered switch 66 will be opened, ending a second control phase during this half wave control period.

For a given control switching frequency $F_s$, for example 100 kilohertz, a full control cycle involves closing and opening both switches 66 and 68 in sequence. Since the voltage $E_o$ is adjusted twice in each control cycle, controller 28 operates at a rate of 200 kilohertz and the voltage $E_o$ is readjusted every 5 microseconds. These control frequencies permit a theoretical control bandwidth of $2F_s/3$ which yields a control frequency bandwidth of 67 kilohertz which for practical hardware reasons can be assumed to be limited to a working bandwidth of 50 kilohertz. This is referred to in the art as the control loop bandwidth $F_{cbw}$.

This is a very fast control loop bandwidth and provides close control over the current delivered to the load. Almost instantaneous control over current is thereby available, particularly in view of the fact that the conventional output inductor which is disposed in series with secondary winding 72 is omitted in the embodiment of FIG. 2. This output inductor is not needed since current averaging is not required with the fast and highly responsive controller 28 of the present invention.

At time $t_B$ when the $T_B$ interval has ended, switch 66 will be opened and the current path for inductor 36 will be abruptly opened. Also at this time the charge on resonating capacitor 64 will have been restored to its original value before the switch 66 was closed except that the polarity of the voltage on capacitor 64 will have been reversed. This sets up the initial condition for the next half cycle. However, at the instant $t_B$ the current through inductor 36 will be equal to a current $i_1(t_A) + \Delta i_1(t_B)$, where $\Delta i_1(t_B)$ is the change in current in L36 which occurs due to the voltage VL36 that is present during the time interval $T_B$. The current in inductor 36 at the instant $t_B$ is designated $i_1(t_B)$.

At time $t_B$ when switch 66 opens, the magnetic energy in inductor 36 is represented by a current $i_1(t_e)$ and is normally lost in consequence of the opening of switch 66. This reduces the efficiency of the converter. In accordance with the present invention, by transformer action of coupled inductor 38 this magnetic energy is coupled to recovery inductance winding 40. The polarity of the current will be in the direction of the arrow appearing next to current $i_b$ in FIG. 2 and therefore diode 46 will be forward biased and conducting. As a result, the magnetic energy of L36 is coupled to recovery inductance winding 40 and is returned to the storage capacitor (not shown) that is included in input filter 14 (FIG. 1). Because the voltage impressed across recovery inductor 40 has a fixed value $V_{in}$, the current will fall off linearly at a slope of $V_{in}/L40$, during a time interval $T_F$, assuming that the inductance of recovery inductor winding diode 40 is L40.

During the interval $T_F$ the voltage across recovery inductor 40, which is connected between return line 70 and $V_{in}$ is clamped to a value $V_{in}$. Assuming a turns ratio of 1:1 between the inductor windings of coupled inductor 38, the transformer actions between the two windings will impress the voltage $V_{in}$ across resonating inductor 36. Therefore, the voltage at the center tap of output transformer 54 will be equal to $2V_{in}$ during the interval $T_F$. The voltage at node points VD1 and VD2 during this interval will be equal to $$VD1 = 2V_{in} - V_p$$

and $$VD2 = 2V_{in} + V_p.$$

This is shown in FIGS. 5b and 5c.

At the end of time interval $T_F$ when $$t = T_A + T_B + T_F$$

resonating inductor 40 will have just depleted its electrical current, assuming a discontinuous mode of operation in which the current in the inductor ceases before the beginning of the next half cycle. In this mode, inductor 40 will no longer be able to forward bias diode 46 and consequently voltage $V_{in}$ will no longer appear across recovery inductor 40 or across resonating inductor 36. This will cause an abrupt drop of the voltage at the center tap 54 of output primary transformer 53. The voltage VM will therefore fall back to a value $V_{in}$ and the voltage at the nodes VD1 and VD2 will respectively fall back to values $V_{in}-V_p$ and $V_{in}+V_p$.

Thus, at the midpoint of the control period, the conditions at VD1(t) will be the same as during the time interval t=0 except that the voltage polarities at nodes VD1 and VD2 will have been interchanged. This is what is needed since during the next half of the control interval switch 68 will be controlled in accordance with the preceding steps.

As described above the converter operates in a "discontinuous mode". It provides the advantage that the converter is capable of turning off current to the output very rapidly as is necessary for example if a fault is detected. Because the control frequency is fixed by the frequency standard of controller 28, controller 28 is easily implemented.

At the same time the present invention could be easily operated so that the current in inductor 38 does not reach a value of zero before the start of the next half cycle i.e. a "continuous mode". The "continuous mode" is sometimes used to minimize output ripple and provides the ability to deliver more power from a given circuit.

The "discontinuous mode" provides other advantages. If the time interval $T_B$ is increased, less time remains for interval $T_F$ during which resonating inductor 36 returns its energy to input rectifier and filter 14. This would produce higher initial currents during the transition from one subcycle to the next. It is possible to close switch 68 before switch 66 is opened. Because a negative voltage step then occurs at node VD2 of FIG. 2, a negative voltage step develops at node VD1. This causes diode 60 to be reverse biased. Thus, current will now flow through S66 even if it is closed. Switch S66 could be subsequently opened to prepare it for the next cycle.

To summarize, in the parallel resonant converter topology of the present invention equivalent capacitor $C_1$ includes both resonating capacitor 64 and a stray capacitance $C_s$. The energy stored in both capacitors is not dissipated or lost during the switching operations. Rather, the energy is recovered and is used both as an additional forcing voltage for more quickly establishing desired operating currents in the filter inductor or the energy is returned back to input filter 14. Resonating inductor 36 operates as a resonating inductor during the time interval $T_A$ and as an output filter inductor during the time interval $T_B$. In both the continuous and the discontinuous mode, inductor 36 assists in establishing the initial conditions for the next half cycle.

The stray capacitance is advantageously harnessed in the topology of the present invention. This helps reduce the size of the converter and increases its efficiency. The coupled inductor feature permits the converter to operate in the buck and boost modes and to easily transfer from one mode of operation to the other. Moreover, the overall efficiency of the converter is increased. The unique and novel design enables fixed control frequency operation. Thus an inherently simpler and more versatile control for the converter is obtained. The converter provides efficiencies of near 90% and its controller is operable to adjust the actual value of this nominal regulated DC voltages.

Although the present invention has been described in relation to a specific embodiment thereof many other variations and modifications will now become apparent to those skilled in the art. It is therefore preferred that the present invention be limited not by the specific disclosure herein but only by the appended claims.

What is claimed is:

1. A converter circuit comprising:
    DC input means for receiving an input line DC voltage;
    a coupled inductor in series with said input line DC voltage and recovery means in the coupled inductor for diverting energy from said coupled inductor to said DC input means;
    an output transformer having a primary winding which includes first and second primary windings connected through a center tap of said output transformer and at least one secondary winding for developing a regulated alternating voltage output, said primary winding being connected to said coupled inductor at said center tap, a stray capacitance appearing across said secondary winding and being reflected across primary windings;
    resonating capacitance located across said primary windings;
    first and second switch means each having respective first and second current conducting terminals and a control terminal, said first and second conducting terminals being connected, respectively, in series circuit relationship to said first and second windings, each of said switch means being operable in an on and an off state in which current flows and does not flow, respectively;
    said reflected stray capacitance, said resonating capacitance and said coupled inductor forming a resonant circuit which resonates at a resonant frequency when one of said switch means in on;
    means for preventing said resonant circuit from resonating beyond one-half of a cycle; and
    control means for alternatively turning said first and second switch means on through their respective control terminal at a control frequency which is less than said resonant frequency, to generate said regulated alternating voltage at said secondary winding, said control means causing only one of said switch means to be on at any time.

2. The converter of claim 1, wherein said preventing means includes first and second reverse voltage blocking means connected in series circuit relationship to said first and second windings, respectively.

3. The converter of claim 2, wherein said first and second reverse voltage blocking means comprise, respectively, first and second diodes.

4. The converter of claim 1, wherein said coupled inductor is comprised of a resonating inductor winding and a recovery inductor winding tightly coupled to and out of phase with one another, said recovery inductor winding comprising said recovery means.

5. The converter of claim 4, wherein said windings of said coupled inductor have a turns ratio of about 1:1 and wherein said windings of said coupled inductor are wound to have a low leakage inductance.

6. The converter of claim 4, wherein said second terminals of said first and second switch means are connected to one another.

7. The converter of claim 1, wherein said coupled inductor is comprised of a resonating inductor winding and a recovery inductor winding tightly coupled to and out of phase with one another, said recovery inductor winding comprising said recovery means, said resonating inductor winding forming said resonant circuit with said reflected stray capacitance and said resonating capacitance.

8. The converter of claim 1, wherein said control terminals of said first and second switch means are referenced to ground whereby said first and second control terminals may be activated with readily producible control signals which are likewise referenced to ground.

9. The converter of claim 1 in which said control frequency is a fixed frequency having high value, in the range of 50 kHz–500 kHz.

10. The converter of claim 1, wherein said control frequency is a constant frequency.

* * * * *